July 3, 1962
O. L. DUBIE ETAL
3,042,001
AUTOMATIC POULTRY CURTAIN RAISER
Filed Nov. 2, 1959
2 Sheets-Sheet 2
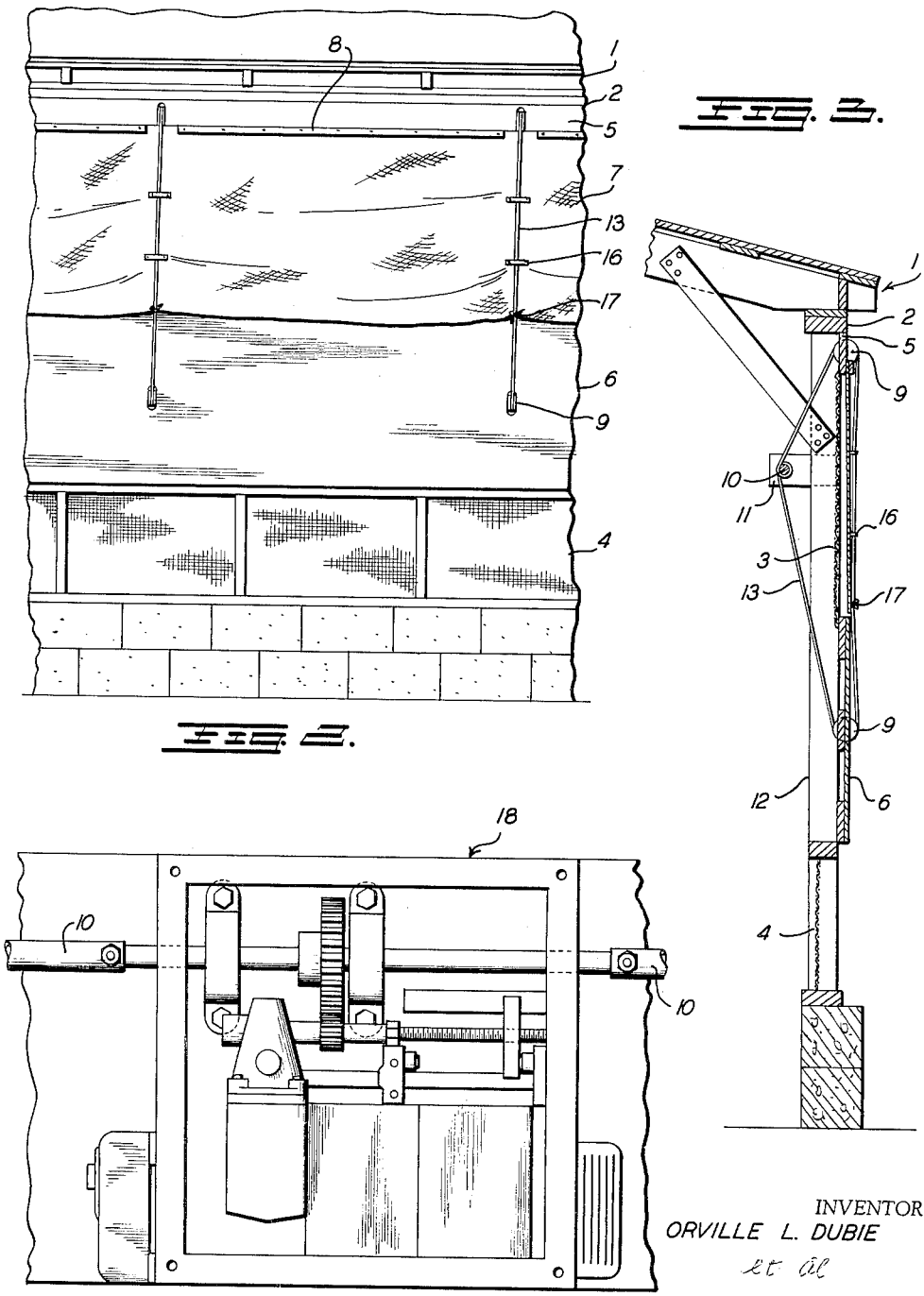
INVENTOR
ORVILLE L. DUBIE
et al
BY *Hamm, Pierre & Kurz*
ATTORNEY

United States Patent Office 3,042,001
Patented July 3, 1962

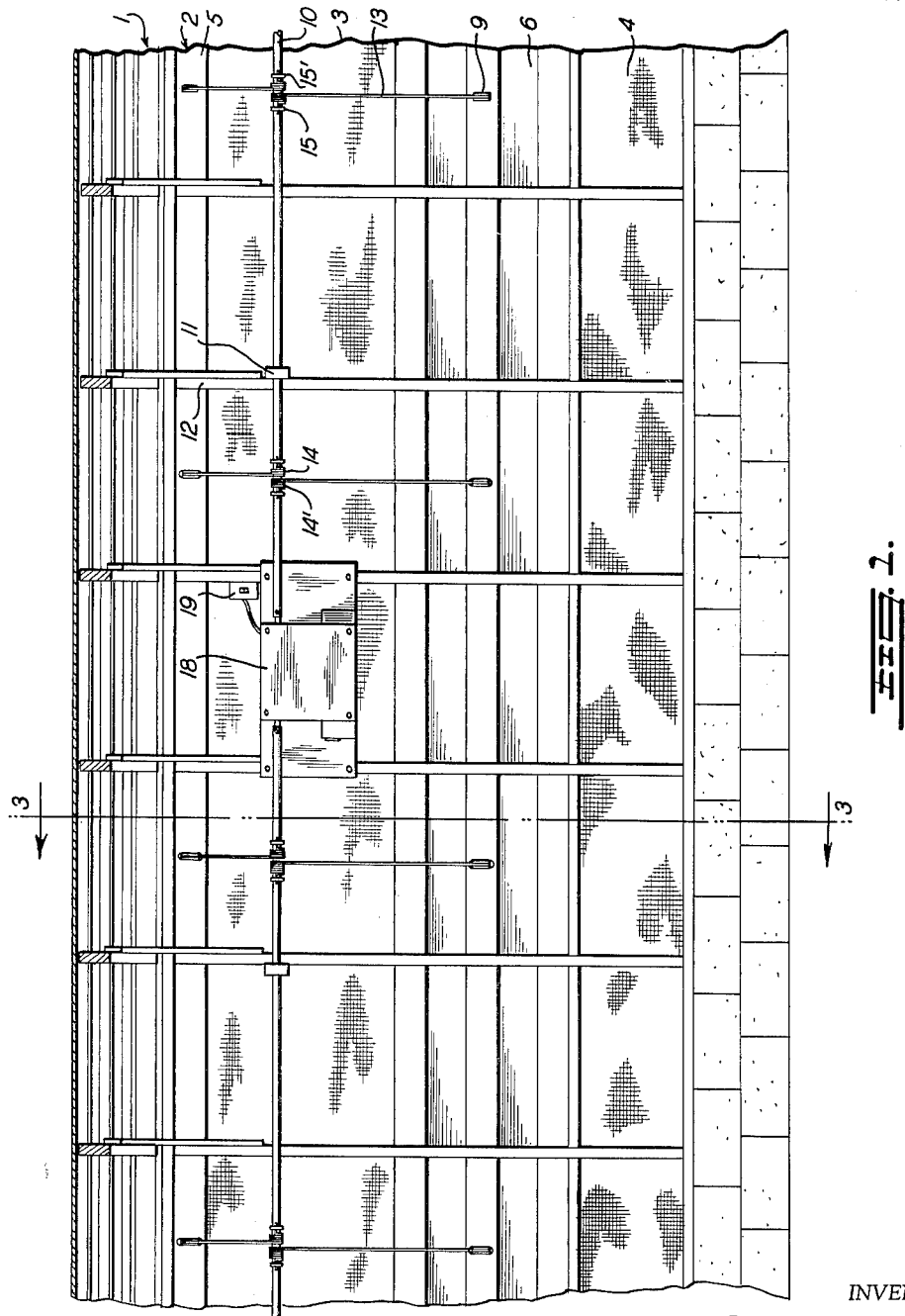

3,042,001
AUTOMATIC POULTRY CURTAIN RAISER
Orville L. Dubie, P.O. Box 671, Toccoa, Ga., and Larry Winford Wolfe, 454 Boulevard, Gainesville, Ga.
Filed Nov. 2, 1959, Ser. No. 850,259
9 Claims. (Cl. 119—21)

This invention relates generally to poultry curtains for poultry coops and more particularly to automatic curtain raising and lowering mechanisms.

Heretofore it has been necessary to manually position louvers or curtains to provide proper ventilation and to maintain a relatively constant ambient temperature within the poultry coops. This is an extreme inconvenience for people in areas subject to constant temperature changes and inclement weather.

It is therefore the primary object of this invention to provide an automatic poultry curtain raiser or actuating mechanism.

A specific object of this invention is to provide an automatic curtain raiser for poultry coops which positions the curtain automatically in response to outside temperature changes to assure a substantially constant ambient temperature within the coop.

Another object of this invention is to automatically position a curtain for poultry coops to provide protection against high winds and inclement weather.

A still further object of this invention is to provide a simple, durable, inexpensive automatically adjusted curtain for poultry coops which can be easily adapted to any standard poultry coop without extensive structural changes.

With these objects and other features and advantages of the invention in mind, which will appear from the following description and claims in connection with the drawings, the invention consists in the novel construction and arrangement of the parts wherein:

FIGURE 1 is a fragmentary elevation view of the inside wall of the poultry coop;

FIGURE 2 is a fragmentary elevation view of the outside of the wall of FIGURE 1;

FIGURE 3 is a sectioned view taken on line 3—3 of FIGURE 1; and

FIGURE 4 is a fragmentary, enlarged, detail view in elevation of the inside wall of the poultry coop showing the automatic temperature actuated drive mechanism for the curtain.

Referring to FIGURES 1, 2 and 3, the reference number 1 indicates generally the poultry coop. A side wall 2 has an upper screened section 3 and a lower screened section 4. An upper portion 5 and center portion 6, between the two screened sections, are formed from any suitable siding materials such as wood panelling.

Referring specifically to FIGURE 2, a curtain 7, of any suitable flexible weather resistant material, is secured on the outside of the poultry coop along its upper edge by wood nailing strips 8 to side panel portion 5. The curtain 7 is of sufficient width to effectively cover the screened portion 3 when in the closed position.

Again referring to FIGURES 1, 2 and 3, pulley members 9 are rotatably secured in slots in the panel portions 5 and 6 at equal intervals of approximately six feet along the entire length of side wall 2. The pulleys 9 are so mounted that a portion of the pulley is extending outwardly on both sides of the side wall 2.

Mounted inside the poultry coop is a horizontal drive shaft 10, which may be of any suitable rigid material and is illustrated in the drawings as a ¾ inch water pipe. The drive shaft 10 is supported by any suitable spaced hanger bearings 11 and is illustrated in the drawings as being made of wood. The hanger bearings 11 are secured to the side wall supports 12.

Draw cables 13, being of any suitable flexible material such as nylon, have their ends secured to the drive shaft 10. One end 14 of the draw cables is wrapped in a counterclockwise direction around the drive shaft 10 and is secured thereto by any suitable clamping means 15. The other end 14' of the draw cable 13 is wrapped in a clockwise direction around the drive shaft and secured thereto by any suitable clamping means 15'. Each draw cable 13, before having its ends 14 and 14' secured to the drive shaft is passed around the pulley members 9 to the outside of the poultry coop and through equally spaced eyelets 16 secured by any suitable means to the surface of the curtain 7. The eyelets 16 allow the draw cables to slide along the curtain as it is being positioned and to assure proper alignment of the cables. The draw cables are rigidly secured by any suitable means at the lower edge of the curtain at points 17.

Referring to FIGURES 1 and 4, a temperature controlled automatic drive mechanism 18, which may be any suitable known temperature controlled drive means, is secured to the inside of the side wall 2.

The drive mechanism illustrated in the drawings is thermostatically controlled and activated, and may be adjusted to any temperature range required for ideal control. A timing device controls the interval of time for which the drive motor (not shown) of mechanism 18 is actuated thus controlling the distance the curtain is raised or lowered. As mentioned, the driver control mechanism may be of any suitable means and is not claimed as a specific part of this invention but only generally as a part of the curtain control system.

An electrical switch 19 is mounted adjacent to the drive mechanism 18 to allow current to energize the timing portion of the drive mechanism.

In operation, the switch 19 is manually turned to the "on" position, which starts the timing portion of the drive mechanism 18. Upon a change in ambient temperature, the thermostatic control portion of drive mechanism will condition the circuit of the drive mechanism 18 to be rotated in one direction upon actuation of the drive motor by the timer. Depending upon the direction of the temperature change, the drive mechanism 18 rotates the drive shaft 10 in one direction or the other. Again depending upon the direction of rotation of the drive shaft 10, the curtain 7 will be raised or lowered by the action of the draw cables 13 wrapping and unwrapping around the drive shaft 10.

If, for example, the curtain is set to operate on a temperature differential of 3 degrees and to raise or lower 4 inches every 10 minutes, and assume the temperature has fallen more than 3 degrees from a set temperature level: the thermostat energizes the drive mechanism circuit to lower the curtain. If it has only been 5 minutes since the last cycle, the curtain does not move. Since the timer has been set for 10 minute intervals, the curtain will operate in 5 more minutes. The amount of travel of the curtain is set by the length of time the drive motor is energized by the timer.

In a like manner the curtain will be raised by the drive mechanism when the temperature outside of the coop rises more than 3 degrees above the set level of internal coop temperature in order to permit more air to circulate through the screen 3.

When the timer conditions the drive mechanism 18 for actuation every ten minutes the shaft 10 will not be turned unless the thermostat has likewise conditioned the mechanism 18. Thus with no temperature variation there will be no curtain movement.

From the foregoing description, it can be seen that the invention provides a simple and efficient apparatus to automatically position a curtain on poultry coops to insure constant protection against changing temperatures and inclement weather.

While the preferred embodiment of the invention has been illustrated and described herein, it will be understood that construction changes may be made within the scope of the appended claims without departing from the spirit of the invention.

We claim:

1. An automatic poultry curtain for selectively covering openings in the outside walls of poultry coops and which is automatically positioned to provide protection for the poultry against inclement weather comprising a flexible curtain, cables spaced along the length of the curtain in a vertical position, said cables having ends secured to a horizontal rotatable shaft within said poultry coop, means to secure the cables to the curtain, and temperature controlled reversible driving means to rotate the shaft to position the curtain.

2. The invention according to claim 1 wherein a timer means associated with the driving means periodically conditions the driving means for actuation of the shaft.

3. An automatic poultry curtain for selectively covering openings in the ouside walls of poultry coops and which is automatically positioned to provide protection for the poultry against inclement weather comprising a flexible curtain member positioned horizontally along the upper portion of an outside wall of said poultry coop, means to secure the upper edge of the curtain to the wall, pulley means mounted in the wall at spaced intervals above and below said curtain, draw cables having ends secured to a horizontally mounted drive shaft within said poultry coop, said cables passing over said pulley means and being secured to the curtain, and temperature controlled reversible drive means to rotate said shaft to position the curtain.

4. The invention according to claim 3 wherein a timer means associated with the driving means periodically conditions the driving means for actuation of the shaft.

5. An automatic poultry curtain for selectively covering the screened walls of poultry coops and which is automatically positioned to provide protection for the poultry against inclement weather comprising a flexible adjustable curtain secured along one edge to a screened wall of the coop, a temperature controlled reversible drive means connected to the wall, a horizontally mounted drive shaft mounted on the screened wall within the coop and rotated by said drive means, and draw cables secured to the drive shaft and the curtain to effectively raise or lower the free edge of said curtain toward or away from its secured edge upon actuation of the drive means.

6. The invention according to claim 5 wherein a timer means associated with the driving means periodically conditions the driving means for actuation of the shaft.

7. An automatic poultry curtain for selectively covering the screened walls of poultry coops and which is automatically positioned to provide protection for the poultry against inclement weather comprising a flexible adjustable curtain, a temperature controlled reversible drive means, a horizontally mounted drive shaft mounted on a wall within the coop and rotated by the drive means, and draw cables secured in spaced relationship to the drive shaft and to the curtain, the ends of said draw cables being oppositely wound and secured to the drive shaft by clamping means to effectively position the curtain upon actuation of said drive means.

8. The invention according to claim 7 wherein a timer means associated with the driving means periodically conditions the driving means for actuation of the shaft.

9. An automatic poultry curtain for selectively covering openings in the outside walls of a poultry coop and which is automatically positioned to provide protection for poultry against inclement weather by substantially stabilizing the temperature within the coop comprising a flexible curtain secured to the coop so as to extend across the wall opening of the coop, reversible electric motor drive means secured to the curtain in such a manner as to be capable of raising or lowering the curtain across the wall opening of the coop, timing means connected with said electric motor to periodically condition the motor to move the curtain a preselected, incremental distance across the coop opening, and thermal responsive means connected with said electric motor to control both the energization of the motor and the direction of rotation of the motor.

References Cited in the file of this patent

UNITED STATES PATENTS

| | | |
|---|---|---|
| 1,130,899 | Heimbourger | Mar. 9, 1915 |
| 1,920,051 | Barney | July 25, 1933 |
| 2,149,481 | Van Bosch et al. | Mar. 7, 1939 |
| 2,499,544 | Vancil | Mar. 7, 1950 |